UNITED STATES PATENT OFFICE.

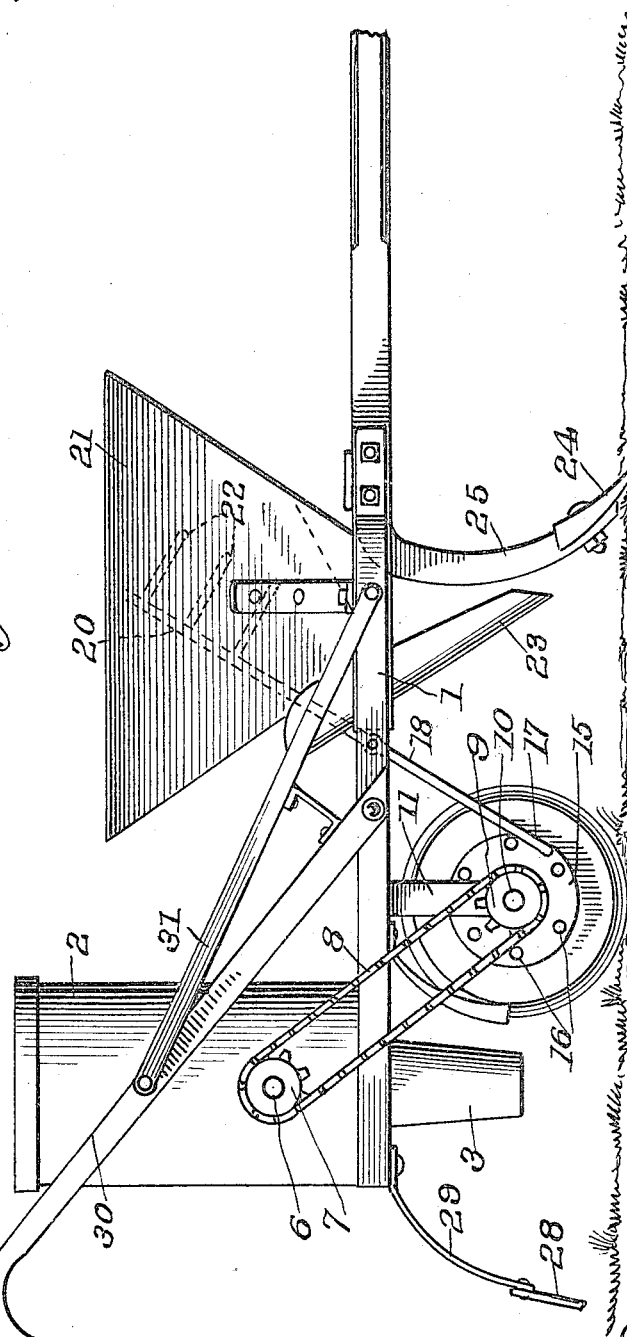

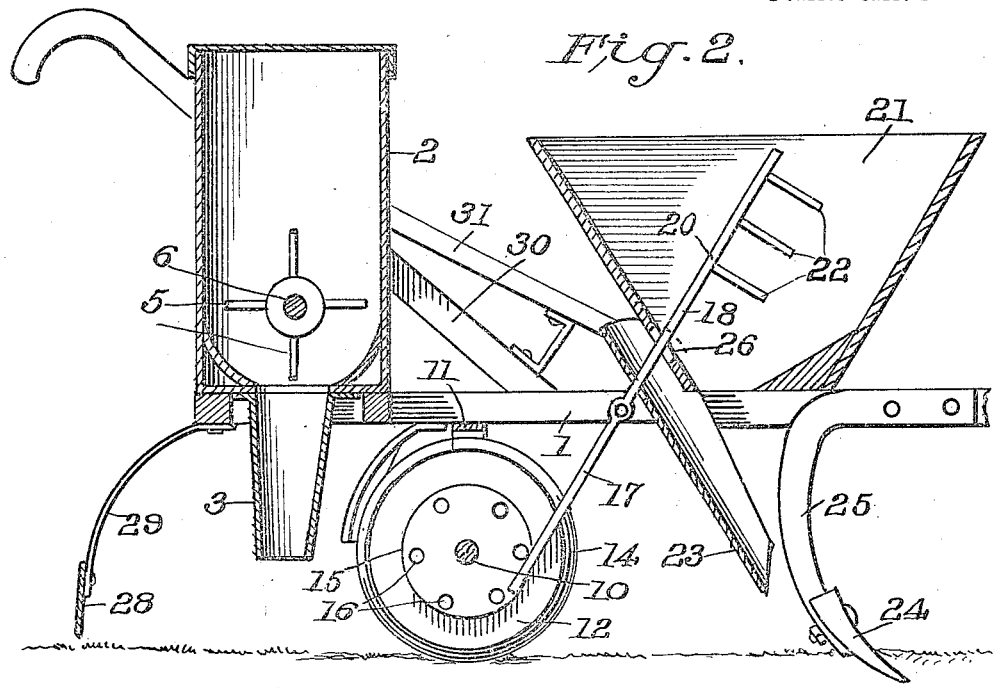
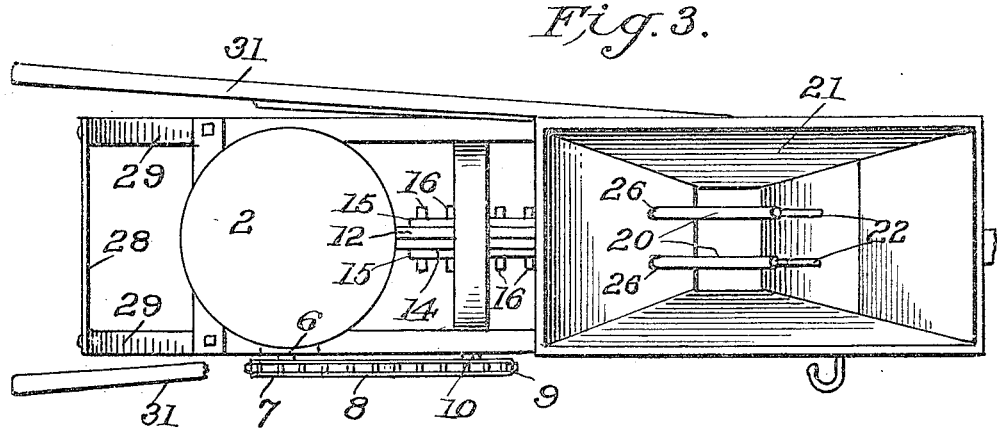

OSCAR C. SIMS, OF PALMETTO, GEORGIA.

PLANTER.

1,229,158.   Specification of Letters Patent.   Patented June 5, 1917.

Application filed June 23, 1914.   Serial No. 846,815.

*To all whom it may concern:*

Be it known that I, OSCAR C. SIMS, a citizen of the United States, residing at Palmetto, in the county of Coweta and State of Georgia, have invented certain new and useful Improvements in Planters, of which the following is a specification.

This invention relates to planters, and more particularly to a planter applicable for planting seed such as cotton seed, corn, beans, or the like.

The primary object of this invention is the provision of a planter as specified, which has a fertilizing attachment positioned forwardly of the planting attachment, and which embodies an oscillatory agitator positioned within the fertilizer container, for agitating the fertilizer upon the traction of the planter.

Another object of the invention is the provision of a novel form of mechanism for operating said agitator, and the provision of a coverer which covers the grain after the same has been planted.

With the foregoing and other objects in view, this invention consists in such novel features of construction, combination, and arrangement of parts as will be hereinafter more fully described, illustrated in the accompanying drawings, and claimed.

In describing the invention in detail, reference will be had to the accompanying drawings, wherein like characters of reference designate like or corresponding parts throughout the several views, and in which:—

Figure 1 is a side elevation of the improved planter,

Fig. 2 is a central longitudinal sectional view through the planter, and

Fig. 3 is a top plan view of the planter.

Referring more particularly to the drawings, 1 designates the supporting frame of the planter, which has a seed containing hopper 2 mounted upon the rear end thereof. The seed containing hopper 2 has a spout 3 communicating with the lower opened end thereof, which spout provides for the proper dropping of the seed from the hopper into the ground. An agitator 5 is mounted within the hopper 2, and upon a shaft 6, which shaft extends transversely through the hopper and has a sprocket wheel 7 mounted upon one of its outer terminal ends. The sprocket wheel 7 has communication, by means of a sprocket chain 8, with a second sprocket 9, which sprocket is mounted upon the axle 10.

The axle 10 is supported by depending brackets 11, which brackets are secured to the supporting frame 1 in any suitable manner, and have the axle journaled in their lower terminal ends. A traction wheel 12 is mounted upon the axle 10 intermediate its ends, and it has plates 14 and 15 secured to its opposite sides and disposed about the central axis of the wheel. The plates 14 and 15 have a plurality of radially disposed laterally projecting pins 16 formed thereon.

The pins 16 are provided for intermittent engagement with the ends 17 of the agitators 18.

The agitators 18 are pivotally mounted upon the supporting frame 1, and they have their upper ends 20 positioned within the fertilizer retaining hopper 21, which hopper is carried by the frame 1 forwardly of the seed retaining hopper 2. The agitators 18 have a plurality of serially arranged transversely projecting fingers 22 on the ends 20 thereof, which fingers tend to agitate the fertilizer within the hopper, upon the oscillatory movement of the agitator 5 which oscillatory movement is caused by the contact of the pins 16 with the ends 17 thereof.

The fertilizer retaining hopper 21 has a spout 23 connected to the rear end thereof, which spout is positioned for the reception of the fertilizer which passes out of the egressing opening of the hopper for depositing the fertilizer in the furrow which is formed by the shovel 24. The shovel 24 is carried by a shovel beam 25, which beam is dependently supported by the frame 1 of the corn planter. The hopper 21 is provided with an elongated opening 26, which permits of the oscillatory movement of the agitator 18, and the hopper also has an inclined base, as is clearly shown in Fig. 2 of the drawings, so as to permit of the emptying or the passage of the fertilizer out of the hopper into the spout 23.

A coverer 28 is secured to the frame 1, rearwardly of the seed dispensing spout 3, by an arcuate supporting arm 29, and the coverer deposits soil or dirt over the seed after the same has been planted.

The ordinary type of handles 30 are secured to the frame 1, and they are braced by bracing rods 31, which are connected to the handles and the frame 1 in the usual manner.

From the foregoing description, taken in connection with the accompanying drawings, the advantages of construction and of the method of operation of the improved planter will be readily apparent to those skilled in the art to which the invention appertains, and while in the foregoing the principle of the operation has been described, together with various features of construction, it is to be understood that certain minor features of construction, combination and arrangement of parts may be altered to suit practical conditions, provided such alterations are comprehended within the scope of what is claimed.

What is claimed is:—

In a planter structure, a supporting frame including side rails, upstanding angle brackets attached to said side rails adjacent to their forward ends, a fertilizer hopper attached to said angle brackets, a seed retaining and dispensing mechanism carried by said side rails rearwardly of said fertilizer hopper, a depending inverted U-shaped bracket attached to said side rails intermediate said fertilizer retaining hopper and said seed retaining and dispensing mechanism, an axle rotatably supported by said U-shaped bracket, a traction wheel mounted upon said axle, an arcuate guard plate carried by said supporting structure and extending over the upper portion of the rear part of said wheel and being positioned in close proximity to the periphery of the wheel for preventing the accumulation of dirt thereon and to prevent the wheel from throwing dirt rearwardly during its rotation, against the seed dispensing mechanism, a pair of depending rearwardly extending arcuate arms attached to the rear ends of said side rails, and a flat covering plate attached to the rear lower ends of said arcuate arms.

In testimony whereof I affix my signature in presence of two witnesses.

OSCAR C. SIMS.

Witnesses:
  A. E. RUTLAND,
  A. B. HYDE.

Copies of this patent may be obtained for five cents each, by addressing the "Commissioner of Patents, Washington, D. C."